United States Patent
Close

[15] 3,657,993
[45] Apr. 25, 1972

[54] COFFEE BREWER

[72] Inventor: Edward S. Close, 175 East Street, Oneonta, N.Y. 13820

[22] Filed: Oct. 15, 1970

[21] Appl. No.: 81,021

[52] U.S. Cl. ..................................................99/297
[51] Int. Cl. ..................................................A47j 31/00
[58] Field of Search ..................99/287, 297, 295, 323

[56] References Cited

UNITED STATES PATENTS

| | | |
|---|---|---|
| 3,158,084 | 11/1964 | Cohn.....................................99/297 |
| 3,120,170 | 2/1964 | Garte.....................................99/287 |
| 2,935,928 | 5/1960 | Keating..................................99/287 |
| 3,413,908 | 12/1968 | Nadelson................................99/297 |

*Primary Examiner*—Robert W. Jenkins
*Attorney*—Richard G. Stephens

[57] ABSTRACT

An improved plunger-type coffee brewer in which the piston-plunger incorporates spring means for packing the coffee in the plunger with a predetermined density irrespective of the amount of coffee loaded in the plunger, and in which an improved plunger seal is provided.

6 Claims, 5 Drawing Figures

INVENTOR.
EDWARD S. CLOSE
BY
Richard D. Stephens

COFFEE BREWER

My invention relates to coffee brewers, and more particularly to an improved plunger-type coffee brewer. A variety of plunger-type coffee brewers are known in the prior art, and various types are shown in the following U.S. Pat Nos., for example: 1,346,485; 1,552,565; 1,699,303; 2,311,759; 2,749,834; 2,935,928 and 3,158,084. It is well known in the prior art that plunger-type coffee brewers offer a number of advantages over "drip" or "percolator" type coffee makers. Plunger-type brewers are much faster and they do not require that the water boil. Because the water need not be exposed to the coffee grounds as long as in other types of coffee makers nor be as hot, objectionable oils in the coffee grounds are avoided in the brewed coffee. Despite these advantages, plunger-type coffee brewers have achieved surprisingly little use, and a primary object of the present invention is to overcome several limitations of prior plunger-type coffee brewers. The operation of prior art coffee brewers, including various plunger-type brewers of which I am aware, disadvantageously allows many fine coffee particles to escape into the coffee liquor, undesirably affecting the taste of brewed coffee, and providing a coffee which becomes increasingly bitter if it is kept for any appreciable length of time. In accordance with one central concept of the present invention, the coffee grounds in a reciprocable plunger are clamped between a pair of plates with a predetermined force, so that the force is distributed substantially over the entire load of coffee grounds. Each of the plates is provided with a plurality of holes through which liquid may pass. By clamping the coffee grounds under pressure between the plates, not only do the plates themselves act as a filter, but the coffee grounds themselves act as a filter, so that many fewer loose coffee particles escape into the brewed coffee. Thus it is one object of the present invention to provide a coffee brewer in which a better brewed coffee is provided by clamping a load of coffee grounds under pressure between a pair of filter plates.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in claims.

For a fuller understanding of the nature and objects of the invention reference should be had to the following detailed description taken in connection with the accompanying drawings, in which.

Figure 1:
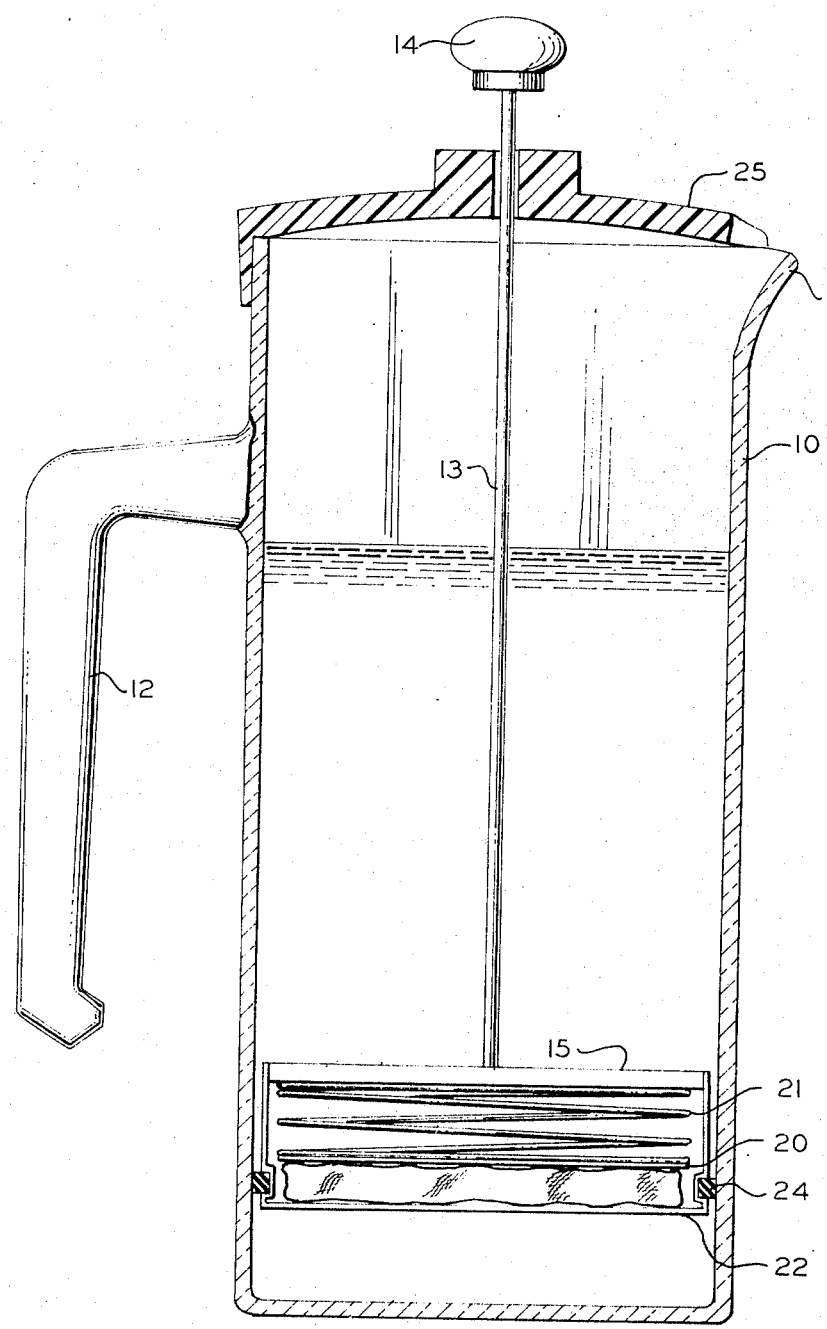
FIG. 1 is a cross-section elevation view of a preferred embodiment of the invention.
Figure 2:
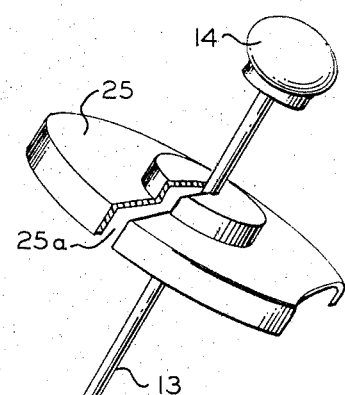
FIG. 2 is an isometric, exploded view of the brewer of FIG. 1, with certain portions shown cutaway for sake of clarity.
Figure 2:
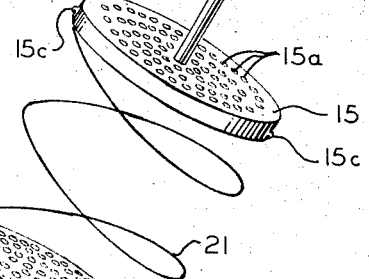
Figure 2:
Figure 2:
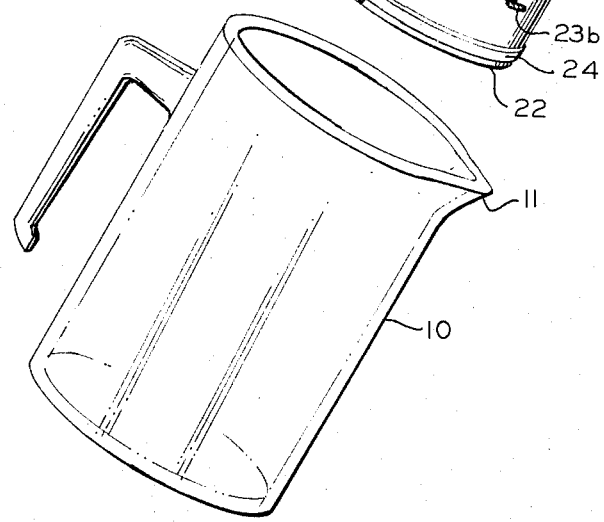

Referring to FIGS. 1 and 2, the improved coffee brewer will be seen to include a container 10 having a cylindrical bore, which preferably is flared at its upper end as shown at 11 to provide a pouring spout, and container 10 is also preferably provided with a handle 12. The container 10 may be formed of metal or various "plastics," but in practice I prefer that it be formed of a high strength glass such as "Pyrex."

The piston assembly includes rigid rod 13 carrying a rounded nylon, hard rubber, or similar cap or knob 14 fixed at its upper end. The lower end of rod 13 is rigidly affixed to piston lid 15, a flat plate having a plurality of strainer holes 15a, 15a, and a flange 15b carrying several projections 15c, 15c which allow piston lid 15 to be locked to piston cup 22, as described hereinbelow.

Piston lid 15 is resiliently connected to flat pressure plate 20 by means of helical compression spring 21, and pressure plate 20 is also provided with a plurality of strainer holes 20a, 20a. Spring 21 preferably has a larger diameter as shown, so that the outer edges of some or all of its turns will lie adjacent the inside of cup 22 with little clearance. The lower end of the piston assembly comprises a generally cylindrical piston cup 22 having a plurality of strainer holes 22a, 22a, through its bottom. An annular recess extending entirely around cup 22 approximately midway along its length or height accommodates seal ring 24. A slightly recessed upper flange 22c of piston cup 22 includes a plurality of L-shaped internal recesses 23, 23, each having a short axially extending portion 23a and a substantially circumferentially extending portion 23b. In order to lock piston lid 15 to piston cup 22, the lid is angularly oriented so that each projection 15c on lid 15 aligns with a respective axially extending recess portion 23a at the upper Flange 23 of cup 22. Lid 15 is forced downwardly so that projections 15c enter and seat in recesses 23a, and then rotation of lid 15 relative to cup 22 causes projections 15c to progress along circumferentially extending recesses 23b, locking lid 15 in place on cup 22. The force of spring 21 will be seen then to urge projections 15c substantially normal to the upper edges of recesses 23b. If desired, these edges may be given a slight axial component, so that a component of the force of spring 21 tends to rotate cup 22 relative to the lid in a direction so as to further secure the two together.

Coffee may be placed in cup 22 either in loose form, or contained in a tissue-covered pad, such a pad being shown at 30 in FIG. 2. With the coffee placed in piston cup 22, pressure plate 20 is placed atop the coffee, and then piston lid 15 is forced down against the force of compression spring 21 and locked in place on piston cup 22. The diameter of pressure plate 20 is preferably made very slightly less than the upper internal diameter of cup 22, so that coffee particles, if placed loose in cup 22, cannot escape upwardly to above plate 20 in any substantial quantity when the plunger is operated. Spring 21 is preferably provided with the large diameter shown so that its mechanical effect is that of a "long spring," and thus pressure plate 20 will be urged against the coffee within cup 22 with substantially the same predetermined force no matter the amount of coffee placed in cup 22, thereby providing a predetermined packing density of the coffee in the cup. Tissue-paper covered pads such as that shown at 30 are preferably provided with suitable amounts of coffee grounds for one or two cups of coffee, and larger quantities of coffee may be made by stacking the desired number of such pads within cup 22. The spring 21 will be seen to apply the same force to all of the pads, and pressure plate 20 will be seen to distribute the force substantially uniformly across the load of coffee grounds. The tissue of the pad or pads acts as further filter means and helps prevent the escape of fine particles into the brewed coffee. It is to be emphasized, however, that the use of tissue-covered coffee pads is unnecessary, and the use of loose loads of ordinary coffee grounds often will be preferred for sake of expense.

With container 10 filled to the extent desired with hot water, which may be heated in container 10 or poured into container 10 from another container, the piston assembly is then inserted into the cylindrical bore of container 10. Lid 25 is then placed atop container 10 to largely close the top. Lid 25 is preferably provided with a radially extending slot 25a which allows lid 25 to be removed from rod 13 to facilitate cleaning. The piston assembly is then forced, by downward pressure on knob 14, through the water, to the bottom or approximate bottom of container 10. The strainer holes or perforations in the bottom of cup 22 and in pressure plate 20 and piston lid 15 allow the water to flow upwardly through the coffee grounds held in cup 22 by pressure plate 20 as the piston assembly is urged downwardly, and when the piston assembly is then pulled upwardly, a reverse flow occurs, downwardly through lid 15, pressure plate 20 and cup 22. The number of strokes required varies with the size (grind) of coffee used and the desired strength. It is quite important, in order that the charge of coffee grounds by "wahsed" substantially uniformly by the water, that the seal around piston cup 22 provide a very effective seal. It is also important, however, that the seal interfere as little as possible with reciprocation of the piston assembly within the container, firstly in that friction of the seal should not add greatly to the force required to operate the piston assembly, and secondly, that the piston should not tend to bind or stick.

After the piston assembly has been reciprocated a sufficient number of times, the assembly is removed from the container, and the coffee may be served from the container. Lid 25 may be slid off of rod 13 and used atop container 10 to decrease heat loss and escape of aroma. It should be noted that the last pass of the coffee liquor through the plunger occurs when the plunger is lifted to be removed from container 10. During that last pass the coffee liquor successively flows through the holes in lid 15, the holes in pressure plate 20, the packed or compressed load of coffee grounds in cup 22, and the holes 22a in the bottom of cup 22. The holes in lid 15, plate 20 and cup 22 serve to filter out or entrap any large coffee particles, so that no such particles will be left in the remaining brew, but more importantly, the compressed coffee grounds packed between plate 20 and the bottom of cup 22 act as a finer filter, filtering out smaller particles. When a load of coffee grounds is packed in cup 22a under compression, the hundreds of spaces or interstices between the grounds provided a much finer filter than what can be provided in a practical manner by means of holes in metal plates or by means of screens. While very fine filtering theoretically can be provided by use of very fine screen meshes, such filters are not only expensive but very difficult to clean. The present invention, by compressing the coffee itself to form a fine filter, overcomes such problems.

Figure 3A:
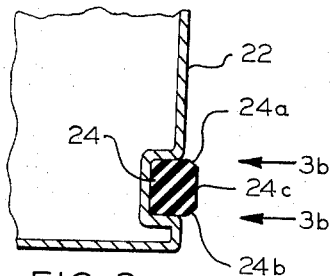
FIG. 3a is an enlarged elevational cross-section view of the plunger seal used in the coffee brewer of FIGS. 1 and 2.
Figure 3B:
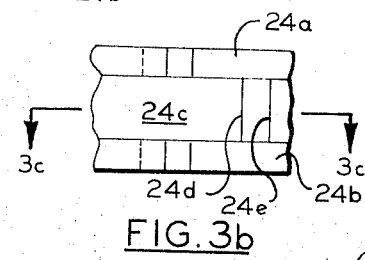
FIGS. 3b and 3c are views taken at corresponding lines in FIGS. 3a and 3b.
Figure 3C:
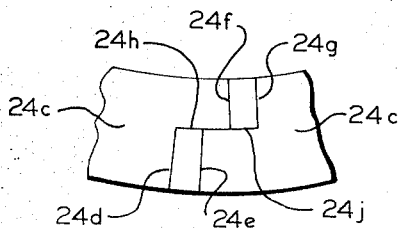

As mentioned above, the provision of an effective seal around the piston cup is of substantial importance. In FIG. 3a it will be seen that seal ring 24, which is preferably formed of rubber or plastic, is seated within an annular recess in cup 22, and provided with bevelled upper and lower sections 24a and 24b, and a thickened center section 24c. Seal ring 24 is not a continuous ring of fixed length, but instead each section is sliced radially partially through at two angular positions slightly displaced from each other, with a circumferential cut joining the two positions at which radial edges are formed. For example, thickened middle secton 24c is sliced radially, half way through its thickness to provide edges 24f and 24g, and sliced circumferentially to provide edges 24h and 24j, thereby allowing the section 24c to vary in length, still providing an effective seal where edges 24h and 24j overlap. Upper and lower sections 24a and 24b are formed similarly, but at a slight distance around from the edges of section 24c, as is indicated in the side view of FIG. 3b.

It will be apparent at this point that various forms of spring means may be substituted for the helical spring shown, and that plural springs may be employed, if desired, to force pressure plate 20 down into cup 22. It will also be apparent that a variety of different latching or locking arrangements may be used to hold lid 15 on the top of cup 22. An electrical heating element (not shown) may be provided in the bottom of container 10 in conventional fashion, if desired.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows.

1. A coffee brewer, comprising, in combination: a container having an internal bore; and a coffee-carrying plunger assembly adapted to be reciprocable within said bore of said container, said plunger including first and second plate means each having a plurality of strainer holes, and spring means urging said plate means toward each other to uniformly compress a load of coffee grounds carried between said plate means.

2. A coffee brewer according to claim 1 in which said first plate means comprises the bottom of a cup means adapted to hold said coffee grounds.

3. A coffee brewer according to claim 2 having lid means attachable to said cup means, said spring means being attached to said lid means and arranged to urge said second plate means toward said bottom of said cup means.

4. A coffee brewer according to claim 1 in which said plunger includes a cup means having a bottom portion forming said first plate means, a lid attachable to said cup means, a plunger rod extending from one side of said lid, said spring means extending from the other side of said lid and one end of said spring means being attached to said lid, said second plate means being attached to the other end of said spring means.

5. A coffee brewer according to claim 1 in which said spring means comprises a helical compression spring.

6. A coffee brewer according to claim 1 in which said plunger includes a cylindrical cup means, and a flexible seal band surrounding said cylindrical cup means, said seal band having a pair of overlapping end portions.

* * * * *